United States Patent [19]

Park

[11] Patent Number: 5,250,805

[45] Date of Patent: Oct. 5, 1993

[54] OPTICAL SENSING TECHNIQUE PROVIDING BUILT IN TEST

[75] Inventor: Eric D. Park, Carlsbad, Calif.

[73] Assignee: BEI Electronics, Inc., San Francisco, Calif.

[21] Appl. No.: 713,885

[22] Filed: Jun. 12, 1991

[51] Int. Cl.⁵ .................................................. H01J 3/14
[52] U.S. Cl. ............................ 250/237 G; 250/231.14; 250/227.21; 324/175
[58] Field of Search ............... 250/227.21, 231.14, 250/231.16, 237 G; 324/175; 341/13; 356/27, 28

[56] References Cited

U.S. PATENT DOCUMENTS

| | | | |
|---|---|---|---|
| 3,559,065 | 1/1971 | Grundy | 324/175 |
| 3,698,772 | 10/1972 | Nixon | 303/21 BE |
| 4,091,280 | 5/1978 | Ellis et al. | 250/231 |
| 4,617,460 | 10/1986 | Tokunaga et al. | 250/237 G |
| 4,638,155 | 1/1987 | Dorr | 324/175 |
| 4,654,523 | 3/1987 | Tanaka | 250/227.21 |
| 4,767,164 | 8/1988 | Yeung | 303/91 |
| 4,870,269 | 9/1989 | Jeunhomme et al. | 250/227 |

FOREIGN PATENT DOCUMENTS 1560124  1/1980  United Kingdom .

Primary Examiner—David C. Nelms
Assistant Examiner—S. Allen
Attorney, Agent, or Firm—Limbach & Limbach

[57] ABSTRACT

An optical apparatus for sensing the motion of an object. A light source transmits light through a first and second optical fiber. The first and second optical fiber are positioned on opposite sides of a modulator or code disk to face each other along an optical path. The modulator has alternating reflective regions and transmissive regions which modulate the light propagating along the optical path as the modulator moves across the optical path. The modulated light is received by the first and second and optical fibers and transported to a predetermined location for evaluation.

18 Claims, 3 Drawing Sheets

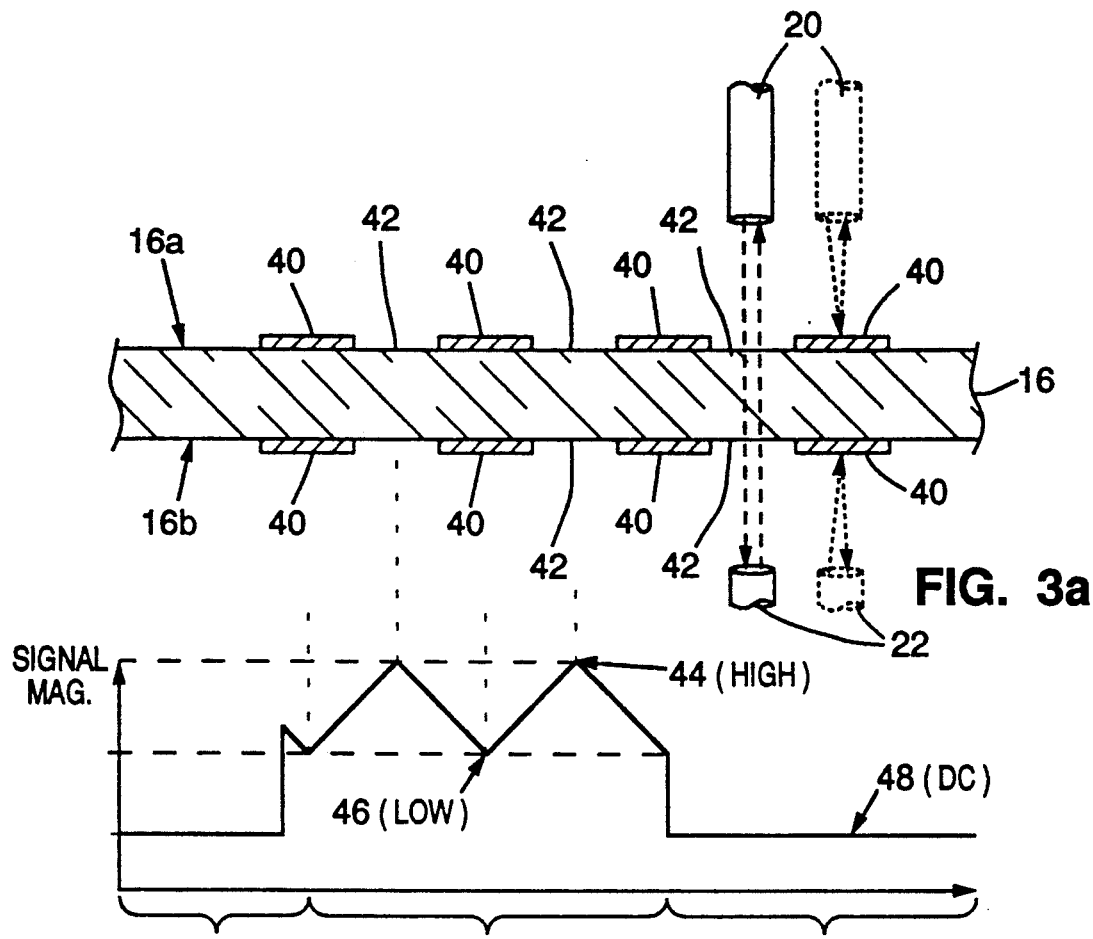
FIG. 3a
FIG. 3b
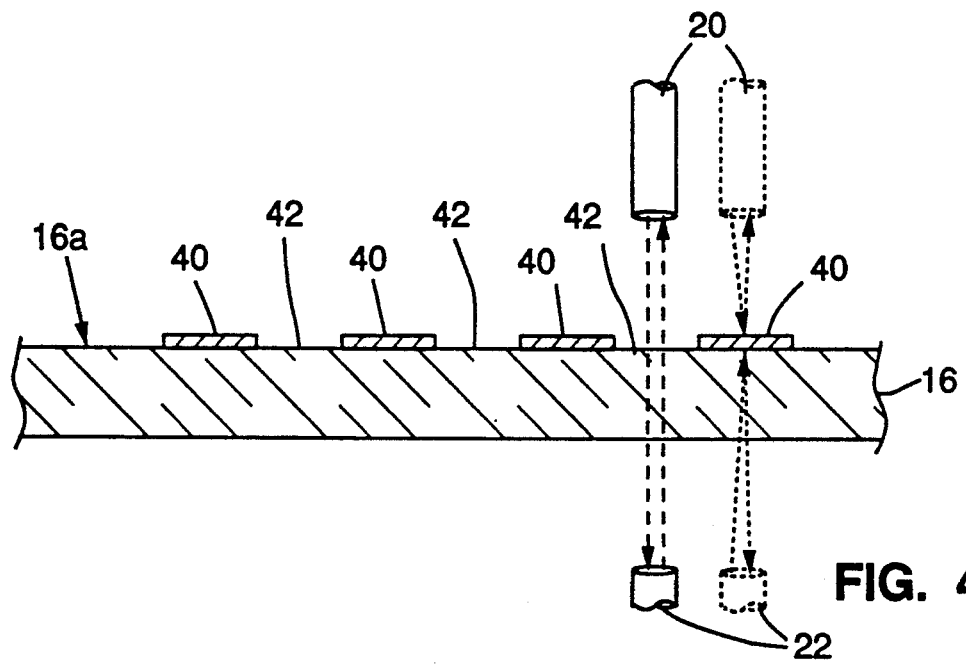
FIG. 4

OPTICAL SENSING TECHNIQUE PROVIDING BUILT IN TEST

BACKGROUND

1. Field of the Invention

The present invention relates to motion sensing, and more specifically, to an optical device for sensing the position or movement of an object.

2. Discussion of the Prior Art

Anti-lock braking systems (ABS) are employed on automobiles and aircraft. Wheel speed sensors are an integral part of ABS systems. In a typical construction, an inductive field proximity sensor generates a pulse train in response to a toothed metallic disk attached to the rotating wheel. However, hostile environmental conditions, such as high temperature and electromagnetic interference, cause problems for inductive devices. Therefore, fiber optic tachometers have recently become popular for use as wheel speed sensors.

One approach to the design of optical fiber wheel speed sensors uses two fibers. The first fiber carries the light from a remote emitter to the wheel disk, where it is then chopped or modulated, received by the second fiber, and returned via the second fiber to a photodetector unit where the optical signal is converted to an electrical signal and processed electronically into the desired output format. The modulation causes the signal to vary from high level (light received by second fiber) to low level (light blocked from second fiber).

Another approach to optical fiber wheel speed sensor design uses a single multimode fiber. See U.S. Pat. No. 4,767,164. The fiber carries light from a remote emitter to the wheel, where a rotatable interrupter, coupled to the wheel, has reflective elements spaced apart on the interrupter to reflect the light back into the fiber. The reflected light is returned in the fiber to a photodetection circuit where a high level signal indicative of operation is generated. When light strikes the rotating interrupter at a position between the reflective elements, no light is reflected and the signal generated by the photodetection circuit represents a low level.

It is highly desirable for ABS and other sensing systems to have self-test functions to verify proper operation. One aspect of the self-test should provide a positive indication that the sensors are connected and operable. This self-test interrogation is often called "built-in-test" (BIT).

Since the light source is typically located remotely from the speed sensor, several optical fibers must be linked together by optical connectors to reach the sensor location. However, optical connectors inherently reflect some of the source light back up the fiber. This creates a background noise level which makes it difficult to differentiate between the noise level and the low level return signal from the speed sensor. This background noise is particularly troublesome when a built-in-test is employed to determine whether the optical path is intact and operating properly. In prior designs, the signal being returned to the photodetector unit varied between a high and a low state. The magnitude of the low state was often of the same magnitude as the background noise caused by reflections off the optical connections in the path. It is, therefore, highly desirable to have a system in which the low level signals being returned from the wheel disk are easily distinguishable from the background noise.

SUMMARY OF THE INVENTION

An optical apparatus for sensing object motion is presented. First optical means transmit light from a source an optical path and receive light which is propagated toward the first optical means along the optical path. Second optical means are positioned opposite the first optical means for transmitting light along the optical path toward the first optical means, and for receiving light propagating toward the second optical means along the optical path.

A modulator is positioned between the first and second optical means, and is coupled for movement with the object. The modulator has a pattern of alternating reflective and transmissive regions. The first and second optical means receive light reflected back from the reflective regions when the reflective regions are positioned in the optical path, and receive light being transmitted through the transmissive regions when the transmissive regions are positioned in the optical path. Means are provided for evaluating the received light.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 2b is a graph showing signal magnitude at the detection circuitry of the tachometer of FIG. 2a.

FIG. 3a is an elevational view of a fiber optic tachometer according to the present invention.

FIG. 3b is a graph showing signal magnitude at the detection circuitry of the present invention.

FIG. 4 is an elevational view of a fiber optic tachometer according to another embodiment of the present invention.

DETAILED DESCRIPTION OF THE INVENTION

Figure 1:
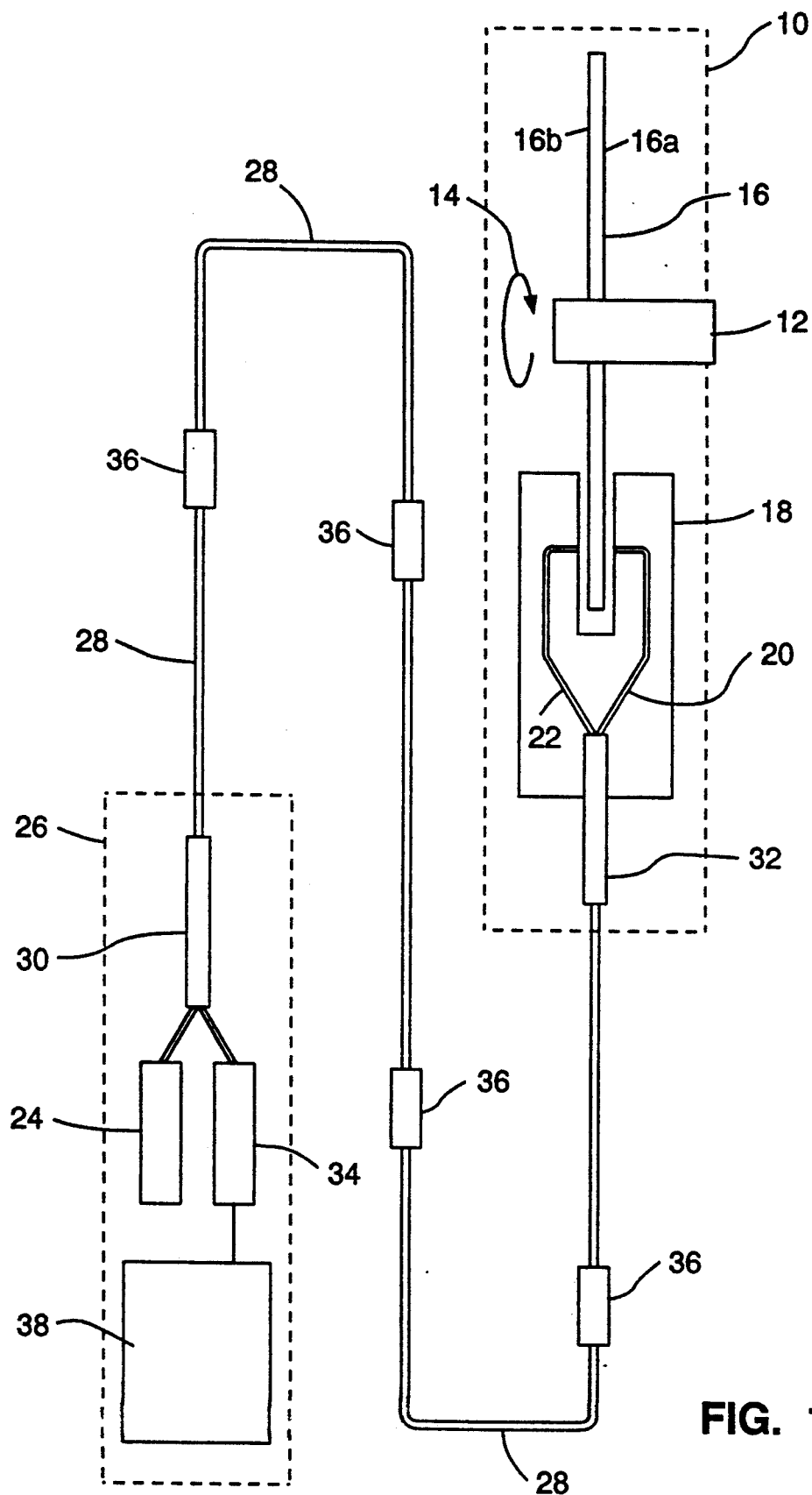
FIG. 1 is a block diagram of an optical speed sensing system according to the present invention.

Referring now to FIG. 1, a wheel assembly 10 has a shaft 12 which rotates in the direction of arrow 14. A code disk 16 is attached for movement with the shaft 12. An optical head 18 is positioned so as to simultaneously interrogate both sides of the code disk 16. The optical head 18 includes optical fibers 20 and 22. Optical fiber 20 is positioned on one side 16a of the code disk 16 to receive light which is reflected off of the disk or which is transmitted through the disk. Likewise, optical fiber 22 is positioned on the other side 16b of the code disk 16 to receive light which is reflected off of the disk or which is transmitted through the disk.

A light emitting diode (LED) 24, housed in electronics module 26, provides source light for the optical fibers. The LED 24 transmits a forward travelling light wave through 2:1 coupler 30 and down multimodal fiber 28 to the optical head 18, where it is preferably equally split and supplied to fibers 20 and 22 by a second 2:1 fused coupler 32. Typically, several lengths of fiber 28 are required between the remotely located electronics module 26 and the optical head 10, and these lengths are linked together through optical connectors 36. Each optical connector 36 may reflect as much as four percent of the light back through the multimodal fiber 28 and coupler 30 to the photodetector 34. The magnitude of such reflections provide a DC bias component of the output signal which can tend to degrade the accuracy and operation of the processing circuitry 38.

As noted above, the fibers 20 and 22 are mutually aligned to interrogate opposite sides of the code disk 16. A forward travelling wave which is transmitted through fiber 20 and passed through code disk 16 (see below) is received by fiber 22 and returned through fiber 28 to photodetector 34. Likewise, a forward travelling wave which is transmitted through fiber 22 and passed through code disk 16 is received by fiber 20 and returned to photodetector 34 through fiber 28. The return travelling waves which reach photodetector 34 are then transmitted to signal processing circuit 38, along with the reflected light waves which have reflected back from the optical connectors 36, where the wave signals are transformed into scaled, usable electronic signals.

Figure 2A:
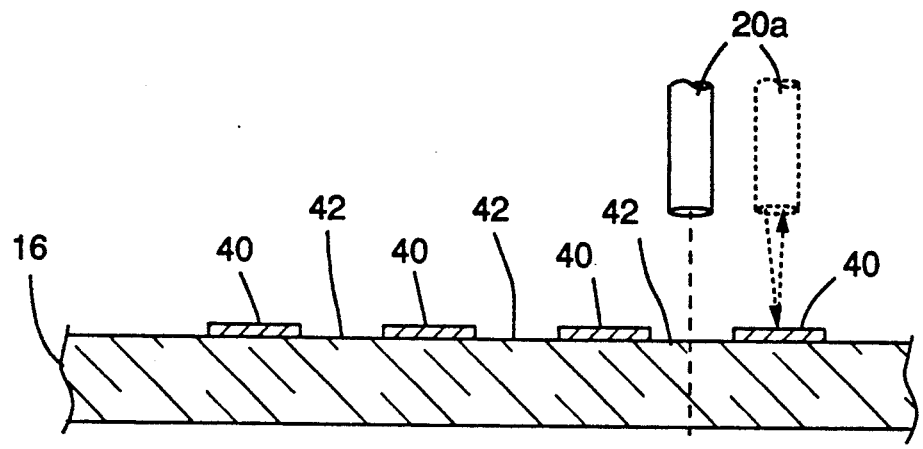
FIG. 2a is an elevational view of a fiber optic tachometer according to the prior art.
Figure 2B:
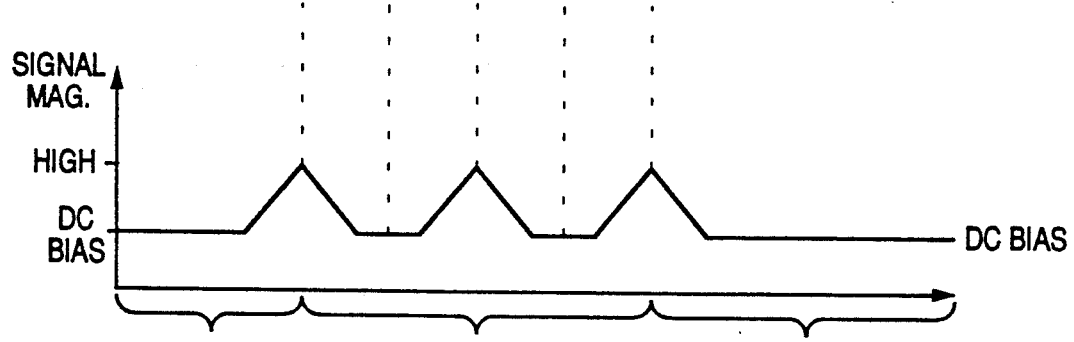

Referring now to FIGS. 2a and 2b, the problem associated with prior art fiber optic sensor designs is illustrated. Code disk 16 has reflective regions 40 and transparent areas 42. As multimode optical fiber 20a is positioned over a reflective region 40, the transmitted light beam is reflected back into the fiber and returned to detection circuitry 38, where the magnitude of the waveform represents a maximum signal (high level =logical 1). As optical fiber 20a is positioned over a transparent region 42, the transmitted light beam is not reflected back into the fiber, thus the magnitude of the waveform at the detection circuitry is minimum (low level =logical 0). However, due to the reflections from optical connectors 36 as described above, a DC bias level signal is present at the detection circuitry 38. Thus, a low level signal generated by the circuitry 38 may be indicative of the sensor 18 being positioned in a transparent region 42, or the sensor may be disconnected and the signal level is due solely to reflections from the optical connectors 36.

This problem is solved by the present invention. Referring now to FIGS. 3a and 3b, the code disk 16 is coated on both sides 16a, 16b with a highly reflective material, such as chrome, inconel, or aluminum. Next, a coat of photoresistive material is applied and exposed with an optical master, such that when the photoresist is developed and washed off, the disk is etched to selectively remove the reflective coating in selected areas 42. The result is preferably a disk with alternating reflective zones 40 and transmissive zones 42 when viewed from either side. It should be noted that the disk could be also be formed on a reflective opaque substrate with transparent elements etched or punched therein to serve as transmissive zones. Thus, when optical fibers 20 and 22 are aligned over a reflective area 40, as illustrated by the dashed-line phantoms of fibers 20 and 22, the forward travelling waves carried by each fiber are reflected back into the respective fibers and back to the photodetector 34 (FIG. 1). In the preferred embodiment, the fibers 20 and 22 are stationary, and the disk 16 moves relative to the fibers. Thus, the fibers 20, 22 are shown in phantom for illustrative purposes only. When the fibers 20 and 22 are aligned in a transmissive area 42, as illustrated by the solid line position, the forward travelling wave carried by each fiber is transmitted through the transmissive area 42 of the disk 16 and received by the opposite fiber, where it becomes a return travelling wave and returns to the photodetector 34 (FIG. 1).

In another embodiment of the disk structure, illustrated in FIG. 4, the code disk 16 is only coated with reflective material on one side 16a of the disk. Thus, when the dashed line phantoms of fibers 20 and 22 are aligned over reflective element 40a, fiber 22 transmits light which is reflected back from reflective element 40a on the opposite side 16a of the disk 16.

The wave transmission process is more efficient than the reflection process. Thus, transmitted waves generate significantly more power than reflected waves, and two distinct power levels exist which describe the signals received from reflective area 40 and those received from transmissive area 42. Therefore, when the optic fibers 20 and 22 are aligned in the center of a transmissive area 42 of the disk 16, received power is at a maximum and a high level signal results, shown by arrow 44. Conversely, when the optic fibers 20 and 22 are aligned over a reflective area 40, received power is at a minimum and a low level signal results, as shown by arrow 46. It should be recognized that the magnitude of the high and low level signals is highly dependent on the choice of optical source, optical fiber (size, index of refraction profile, numerical aperture, and intrinsic loss per kilometer), coupling efficiency of the source to the fiber, connector losses, and fused fiber coupler characteristics. However, the high level signal may range from approximately sixty to eighty percent of the source light power, whereas the low level signal may range from approximately twenty to forty percent of source light power. Under normal operating conditions, the disk 16 will rotate and subject the optic fibers 20 and 22 to alternating reflective zones 40 and transmissive zones 42. Thus, a sawtooth wave pattern representing the high and low levels will result, as shown in FIG. 2b. From this pattern, speed determinations may be made.

In the event of a malfunction or disconnection of the optical head 18, interrogation of the disk 16 will not occur. Thus, high and low level signals will not be generated. A third level signal, representing the DC bias described above and shown by arrow 48, always exists due to the reflections off the connectors 36. The DC bias level is lower than the low level signal described above, since the low level signal is the combination of reflections from the connectors 36 added to the reflections from reflective areas 40. Thus, a disconnect state can always be distinguished from a low level signal.

In a preferable construction of the present invention for use in aircraft ABS systems, the sensor 18 would be optically powered by a gallium-aluminum-arsenide LED 24 operating at a wavelength of 850 nanometers. The LED is coupled into a 200 micron core diameter multimode step index optical fiber 28. See FIG. 1. Other core size multimode fibers could be used with similar results. The optical connectors 36 are MIL-38999 style connectors with optical contacts (pins and sockets) conforming to MIL-T-29504 (size 16). Couplers 30, 32 are integrally formed with the 200 micron core fiber and packaged in a channel measuring 0.4×0.07×0.09 inches. The couplers 30, 32 display excess loss of less than 0.5 decibels. The optical head 18 may be manufactured out of aluminum, stainless steel, or a carbon or glass fiber reinforced polymer. Stainless steel (416SS) is preferable for aircraft applications due to the high temperatures experienced by aircraft braking systems. The code disk 16 is preferably photochemically etched on deposited metal to avoid the difficulty of aligning the optical pattern on the top and bottom surfaces of a glass substrate. This also avoids concerns over glass code disk breakage in high shock environments such as landing gear. The photodetector 38 is preferably a silicon PIN photodiode followed by a first stage operational amplifier configured as a transimpedance amplifier. This setup will transform the optical signal into an amplified voltage signal. Further signal processing will be performed by standard electronic components such as switching comparators, etc.

The present invention can be used in connection with code disks or substrates in which the transparent regions are formed by removing material from the disk or substrate by stamping, punching, or similar conventional methods.

It should be understood that the invention is not intended to be limited by the specifics of the above-described embodiment, but rather defined by the accompanying claims.

I claim:

1. An optical apparatus for sensing the motion of an object, including a light source for propagating light waves and a photodetector for receiving light waves, comprising:
   a. first optical means coupled to the light source for transmitting light waves along an optical path and for receiving light which is propagating toward the first optical means along the optical path;
   b. second optical means coupled to the light source and positioned opposite the first optical means for transmitting light waves along the optical path toward the first optical means, and for receiving light which is propagating toward the second optical means along the optical path; and
   c. modulator means positioned in the optical path between the first and second optical means and coupled for movement with the object, said modulator means having a pattern of alternating reflective and transmissive regions thereon, wherein said first and second optical means receive light which is reflected from the reflective regions when the reflective regions are positioned in the optical path, and wherein said first and second optical means receive light which is transmitted through the transmissive regions when the transmissive regions are positioned in the optical path.

2. The optical apparatus of claim 1, wherein the modulator means comprises a substantially transparent substrate having a first plurality of reflective indicia positioned in a pattern on one face of the substrate such that light which is transmitted through the first and second optical means is reflected off of the reflective indicia when the reflective indicia are positioned in the optical path and passed through the substantially transparent substrate when the reflective indicia are not positioned in the optical path.

3. The optical apparatus of claim 2, further comprising a second plurality of reflective indicia positioned on an opposite face of the substrate and in the same pattern as the first plurality of reflective indicia, and wherein the first plurality of reflective indicia and the second plurality of reflective indicia are in substantial registration with one another when viewed along an axis which is normal to the faces of the substrate to form reflective and transparent regions on the substrate.

4. The optical apparatus of claim 1, wherein the modulator means comprises a reflective opaque substrate having a plurality of transparent regions formed therein, such that light transmitted through the first and second optical means is transmitted through the transparent regions when the transparent regions are positioned in the optical path and is reflected back through the first and second optical means when the transparent regions are not positioned in the optical path.

5. The optical apparatus of claim 1, wherein the first and second optical means comprise a first and second optical fiber, respectively.

6. An optical apparatus for sensing the motion of an object comprising:
   a. a light source;
   b. a first optical fiber coupled to the light source for transmitting light along an optical path and for receiving light which is propagating toward the first fiber along the optical path;
   c. a second optical fiber coupled to the light source and positioned opposite the first fiber for transmitting light along the optical path toward the first fiber, and for receiving light propagating toward the second fiber along the optical path;
   d. modulator means positioned between the first and second fibers and coupled for movement with the object, said modulator means having a pattern of alternating reflective and transmissive regions when viewed from either side of the disk, wherein the first and second fibers receive light reflected from the reflective regions when the reflective regions are positioned in the optical path, and receive light being transmitted through the transmissive regions when the transmissive regions are positioned in the optical path;
   e. means coupled to the first and second optical fibers for evaluating the light received in the first and second fibers.

7. The optical apparatus of claim 6, wherein the modulator means comprises a substantially transparent substrate having a first plurality of reflective indicia positioned in a pattern on one face of the substrate , such that the first and second transmitting and receiving means receive light reflected off of the reflective indicia when the reflective indicia are positioned in the optical path, and receive light being transmitted through the substantially transparent substrate when the reflective indicia are not positioned in the optical path.

8. The optical apparatus of claim 7, further comprising a second plurality of reflective indicia positioned on an opposite face of the substrate and in the same pattern as the first plurality of reflective indicia, and wherein the first plurality of reflective indicia and the second plurality of reflective indicia are in substantial registration with one another when viewed along an axis which is normal to the faces of the substrate to form reflective and transparent regions on the substrate.

9. The optical apparatus of claim 6, wherein the modulator means comprises a reflective opaque substrate having a pattern of transparent regions formed therein.

10. The optical apparatus of claim 6, wherein the first and second optical fibers comprise first and second multimode optical fibers, respectively.

11. The optical apparatus of claim 6, wherein the means for evaluating comprises:
   a. means for combining the light received from the first and second optical fibers;
   b. a photodetector circuit; and
   c. a third optical fiber coupled between the combining means and the photodetector circuit.

12. An optical apparatus for sensing the motion of a rotatable object, comprising:

a. a code disk coupled for movement with the object and having reflective and transmissive areas in an alternating pattern when viewed from either side of the disk;

b. a first multimode optical fiber disposed on one side of the disk for transmitting and receiving light along an optical path, said optical path extending through the disk in a generally normal orientation;

c. a second multimode optical fiber disposed on the other side of the disk for transmitting and receiving light along the optical path;

d. means coupled to the first and second fibers for propagating light waves along the first and second optical fibers toward the code disk; and e. means coupled to the first and second optical fibers for evaluating received light waves.

13. The optical apparatus of claim 12, wherein the light propagating means comprises a light source connected to the first and second fibers by a 1:2 optical coupler.

14. The optical apparatus of claim 13, wherein the light source is a light emitting diode.

15. The optical apparatus of claim 13, wherein the light source is remotely located relative to the code disk.

16. The optical apparatus of claim 15, wherein each of the first and second multimodal fibers comprise a plurality of such fibers connected to each other by a plurality of optical couplers.

17. The optical apparatus of claim 14, wherein the light receiving means comprises a photodetector coupled to the first and second multimodal fibers via a 1:2 optical coupler.

18. The optical apparatus of claim 17, wherein the light receiving means further comprises signal processing circuitry connected to the photodetector.

* * * * *